United States Patent
Hasegawa

(10) Patent No.: US 10,101,530 B2
(45) Date of Patent: Oct. 16, 2018

(54) INTERSECTING SPLITTER, AND MULTICAST SWITCH AND MULTICAST SWITCH MODULE USING SAME

(71) Applicant: FURUKAWA ELECTRIC CO., LTD., Tokyo (JP)

(72) Inventor: Junichi Hasegawa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/649,264

(22) Filed: Jul. 13, 2017

(65) Prior Publication Data

US 2017/0307818 A1   Oct. 26, 2017

Related U.S. Application Data

(63) Continuation of application No. PCT/JP2016/053819, filed on Feb. 9, 2016.

(30) Foreign Application Priority Data

Apr. 13, 2015   (JP) .................................. 2015-081789

(51) Int. Cl.
| | |
|---|---|
| *G02B 6/12* | (2006.01) |
| *G02B 6/125* | (2006.01) |
| *G02B 6/35* | (2006.01) |
| *G02F 1/313* | (2006.01) |
| *H04Q 11/00* | (2006.01) |
| *H04J 14/02* | (2006.01) |

(52) U.S. Cl.
CPC ............ *G02B 6/125* (2013.01); *G02B 6/3596* (2013.01); *G02F 1/313* (2013.01); *H04J 14/021* (2013.01); *H04Q 11/0005* (2013.01); *G02B 2006/1215* (2013.01); *H04Q 2011/0015* (2013.01); *H04Q 2011/0047* (2013.01)

(58) Field of Classification Search
CPC ...... G02B 6/3596; G02B 6/125; H04J 14/021
See application file for complete search history.

(56) References Cited

U.S. PATENT DOCUMENTS

| | | | |
|---|---|---|---|
| 2005/0013528 A1 | 1/2005 | Doerr | |
| 2012/0321241 A1* | 12/2012 | Julien | .................... G02F 1/313 385/3 |
| 2013/0108215 A1 | 5/2013 | Ticknor et al. | |

FOREIGN PATENT DOCUMENTS

| | | |
|---|---|---|
| JP | 2014-533018 A | 12/2014 |
| WO | WO-2011/077873 A1 | 6/2011 |
| WO | WO-2014/167800 A1 | 10/2014 |

OTHER PUBLICATIONS

International Search Report issued in PCT/JP2016/053819 dated May 10, 2016.

* cited by examiner

*Primary Examiner* — Sung Pak
*Assistant Examiner* — Hoang Tran
(74) *Attorney, Agent, or Firm* — Marshall, Gerstein & Borun LLP

(57) ABSTRACT

An intersecting splitter configured so that the branching ratio of each optical splitter differs in accordance with the difference in the number of intersections in each branched waveguide. The branching ratios (totaling 100%) of the optical splitters are adjusted so that the branching ratios on the high side as to the number of intersections is high in comparison with the branching ratios on the low side as to the number of intersections, and it is thereby possible to level the total loss.

5 Claims, 10 Drawing Sheets

INTERSECTING SPLITTER, AND MULTICAST SWITCH AND MULTICAST SWITCH MODULE USING SAME

TECHNICAL FIELD

This disclosure relates to an intersecting splitter in which variation in loss per port is small and the maximum loss can be reduced, and the like.

BACKGROUND

To achieve CDC (Colorless, Directionless and Contentionless)—ROADM (Reconfigurable Optical Add/Drop Multiplexer), multicast switches in which optical splitters and optical switches are combined together have been in use. As a multicast switch, a dual type multicast switch that is equipped with add/drop functions in one housing, such as 8×8 multicast switch, has been mainly used. In future, further increase in the number of wavelength is expected.

As one of the methods to reduce the size of the multicast switch, for example, a use of intersecting splitters in which waveguides are intersecting with each other on a same plane have been proposed, for example by International Patent Publication No. 2014/171083 (WO2014/171083).

SUMMARY OF THE DISCLOSURE

With the use of intersecting splitters, it is possible to reduce the size of a multicast switch even when the number of input and output is increased. However, as mentioned in wo2014/171083, there is a problem that transmission loss arises at the intersecting sections of the waveguides (hereinafter, referred to as intersection loss).

Also, in the intersecting splitter, the number of intersections of waveguides is different for each branched port. Thus, there is a problem that the port with many intersections has larger intersection loss. Also, since the number of intersections varies, theres is a problem that the intersection loss per port varies and the variation in loss becomes large.

The presently disclosed embodiments were achieved in view of such problems. Its object is to provide an intersecting splitter in which variation in loss per port is small and the maximum loss can be reduced, and the like.

To achieve the above object, a first embodiment is an intersecting splitter including a plurality of optical splitters, in which at least some of waveguides included in the plurality of the optical splitters intersect with each other on a plane and a branching ratio of each of the optical splitters varies in accordance with a difference in the number of intersections of each of the branched waveguides.

A second embodiment is a multicast switch that includes a splitter section including the intersecting splitter according to the first embodiment, a switch section, which is connected to the splitter section and includes a switch array for selecting paths for optical signals, and a board on which the splitter section and the switch section are disposed.

The switch section may include a plurality of switch arrays, and the switch arrays may include a plurality of stages of optical switches. Each port branched from one same port by the optical splitter is connected to each of the plurality of the switch arrays. The number of stages of the optical switches may vary in the each switch array to be connected, and the branching ratios of at least some of the optical splitters may be set in accordance with the difference in the number of stages of the optical switches in addition to the difference in the number of intersections of the waveguides.

A splitter-side port, which inputs and outputs signal light to/from the splitter section, and a switch-side port, which inputs and outputs signal light to/from the switch section, may be disposed on a same side face of the board. A plurality of the switch arrays may be divided into a pair of switch-array groups and one of the switch-array groups and the other of the switch array-groups may be arranged on the board in directions inverted to each other.

A multicast switch for add and a multicast switch for drop may be disposed on the same board. Splitter side ports, which input and output signal light to/from the splitter section of the multicast switch for add and switch side ports, which input and output signal light to/from the switch section of the multicast switch for drop, may be disposed on one side face of the board, and switch side ports of the multicast switch for add and splitter side ports of the multicast switch for drop may be disposed on the other side face of the board. A plurality of the switch arrays of the multicast switch for add may be divided into a pair of switch-array groups and one of the switch-array groups and the other of the switch-array groups may be arranged on the board in tandem facing toward a same direction. A plurality of the switch arrays of the multicast switch for drop may be divided into a pair of switch-array groups and one of the switch-array groups and the other of the switch-array groups may be arranged on the board in tandem facing toward a same direction. The multicast switch for add and the multicast switch for drop may be disposed in directions inverted to each other.

A third embodiment is a multicast switch module including a plurality of dual-type MCS units, which are provided side by side, and a splitter. Each of the dual-type MCS units includes a pair of the multicast switches according to the second embodiment and a control section that controls the multicast switches. The splitter branches or merges signal light to the each multicast switch of each of the dual-type MCS units.

Alternatively, disclosed is a multicast switch module including a plurality of dual-type MCS units, which are provided side by side, and a splitter. Each of the dual-type MCS units includes the multicast switch according to the second embodiment and a control section that controls the multicast switch. The splitter branches or merges signal light to the each multicast switch of each of the dual-type MCS units.

The presently described embodiments can provide an intersecting splitter in which variation in loss per port is small and the maximum loss can be reduced, and the like.

BRIEF DESCRIPTION OF DRAWINGS

FIG. 4 (b) is a drawing showing a structure of a connection section between an intersecting splitter 7c and a switch section 5.

FIG. 6 (b) is a drawing showing a structure of a connection section between an intersecting splitter 7c and a switch section 5.

FIG. 7 is a drawing showing a multicast switch 1a.

FIG. 10 is a drawing showing a multicast switch module 20a.

DETAILED DESCRIPTION

<Multicast Switch>
(First Embodiment)

Figure 1:
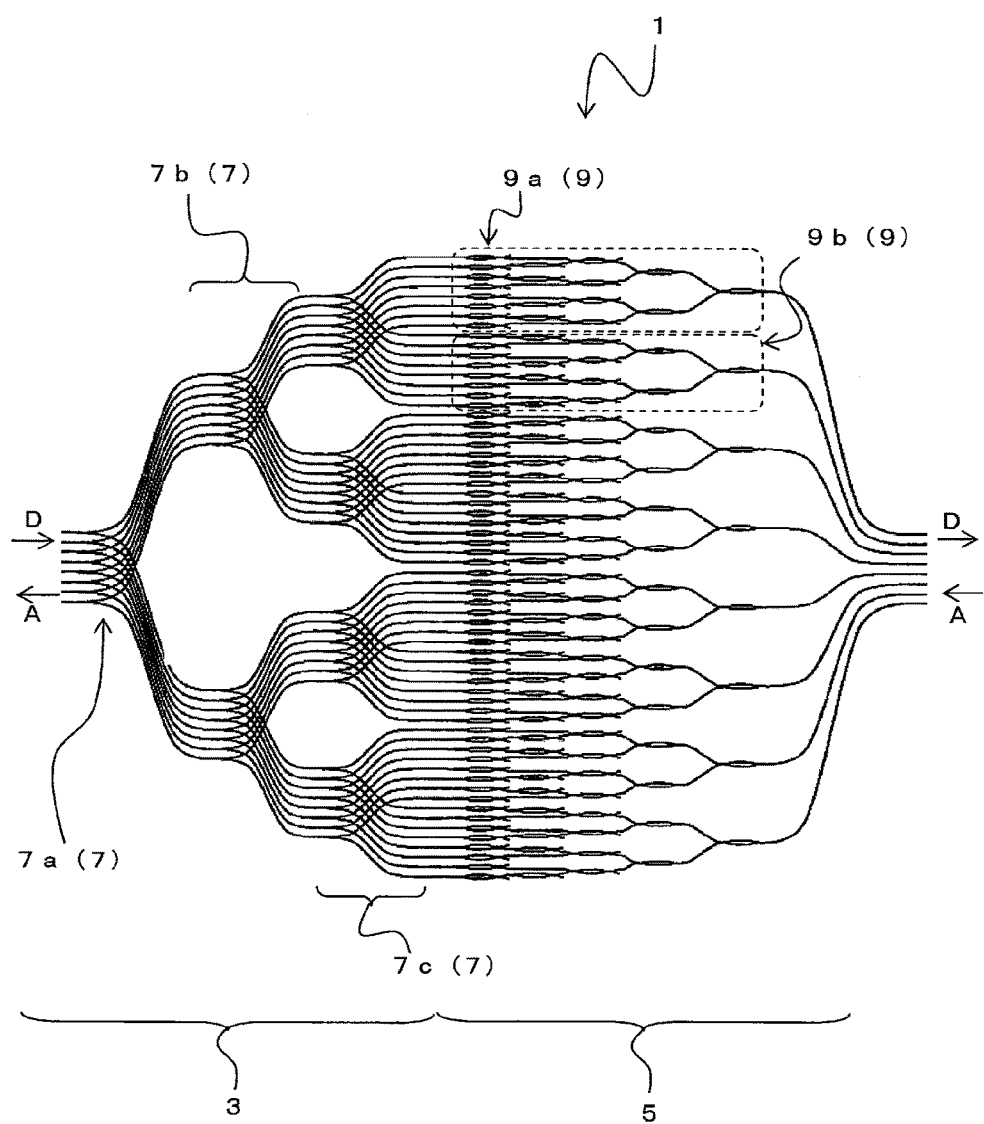
FIG. 1 is a drawing showing a multicast switch 1.

Hereinafter, a multicast switch 1 according to a first embodiment will be described. FIG. 1 is a drawing showing a multicast switch 1. The board is omitted in the drawings hereinafter. An arrow D in the drawing indicates an input/output direction of light when used as a multicast switch for drop, and an arrow A in the drawing indicates an input/output direction of light when used as a multicast switch for add. That is, in the present embodiment, the light enters from one side face of the board and exits from the other side face facing thereto. Although an example of 8×8 multicast switch will be shown in the descriptions below, the contemplated embodiments are not limited thereto.

The multicast switch 1 includes a splitter section 3 and a switch section 5. The splitter section 3 includes three rows of 1×2 intersecting splitters 7 (7a, 7b, 7c). That is, one port is branched into eight ports by the three rows of the intersecting splitter 7a, 7b, and 7c. Waveguides intersect with each other on a plane in each of the intersecting splitters 7a, 7b, and 7c.

Figure 2:
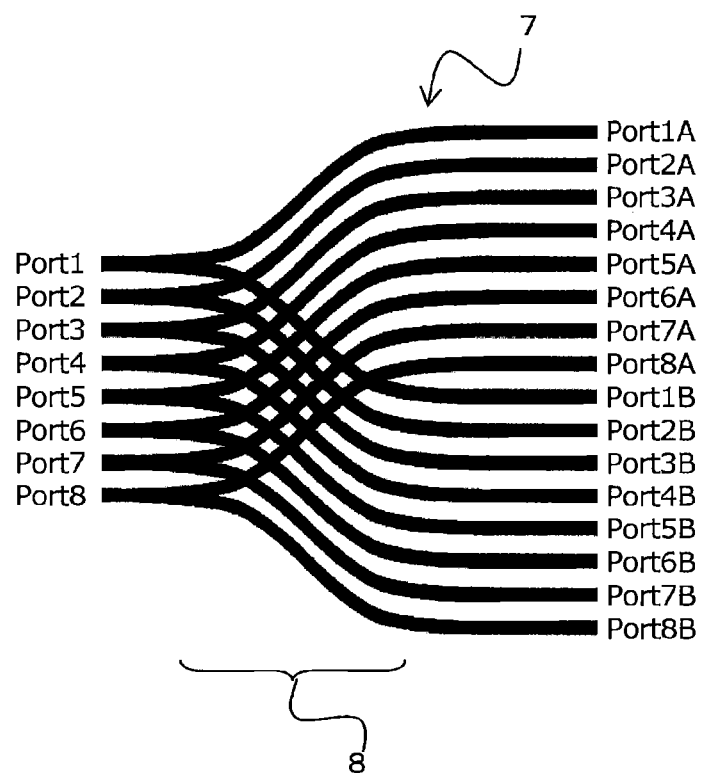
FIG. 2 is a drawing showing an intersecting splitter 7.

FIG. 2 is a drawing showing the intersecting splitter 7 according to the preset embodiment. The intersecting splitter 7 has eight optical splitters arranged in parallel. Each optical splitter is a 1×2 optical splitter and a port on one end is branched into two ports at the other end. In the intersecting splitter 7, the waveguides of the eight optical splitters intersect with each other in such a manner that the order of the waveguides on a common port side (the left side in the drawing) is the same as the order of the waveguides on a branched port side (the right side in the drawing). Specifically, the ports on the common port side of the eight optical splitters are arranged in the order of 1ch to 8ch (Port1 to Port8 in the drawing) while the ports on the branched port side of the eight optical splitters are arranged in two sets in the order of 1ch to 8ch (Port1A to Port8A and Port1B to Port8B in the drawing).

As above, the intersecting splitter 7 has intersecting sections 8 where the waveguides intersect with each other so that the branched waveguides are arranged side by side in order as shown in the drawings. Here, intersection loss arises at the intersecting sections 8 because the waveguides intersect with each other. In the present embodiment, the intersecting splitter 7 is made by using a planar lightwave circuit (PLC) that is formed on a quartz board, for example. Note that, by increasing a relative refractive index difference Δ between a core and a cladding, downsizing of the multicast switch 1 can be achieved. On the other hand, the use of the high relative refractive index difference Δ leads to an increase in the intersection loss of the waveguides. The high relative refractive index difference Δ between 2.5% and 10% can be attained by using zirconia ($ZrO_2$), for example, as a dopant for raising the relative refractive index difference Δ.

The intersection loss per intersection can be estimated as approximately 0.05 dB/cross when the relative refractive index difference Δ is 5%, for example. Also, for the optical splitter that branches from Port1 into Port1A and Port1B, for example, the number of intersections is zero for Port1 to Port1A, while the number of intersections is seven for Port1 to Port1B. Thus, while there is no intersection loss arising for Port1 to Port1A, the intersection loss of approximately 7 (the number of intersections)×0.05 dB/cross=0.35 dB arises for Port1 to Port1B.

Thus, since the number of intersections of the waveguides is different for each branched port, the intersection loss is different for each branched port.

Table 1 shows the intersection loss at each port when each of the optical splitter branches light with a normal branch ratio of 50%/50%.

TABLE 1

| | branch ratio (%) | | number of intersections | loss dB |
|---|---|---|---|---|
| Port1 | 50 | Port1A | 0 | 3.20 |
| | 50 | Port1B | 7 | 3.55 |
| Port2 | 50 | Port2A | 1 | 3.25 |
| | 50 | Port2B | 6 | 3.50 |
| Port3 | 50 | Port3A | 2 | 3.30 |
| | 50 | Port3B | 5 | 3.45 |
| Port4 | 50 | Port4A | 3 | 3.35 |
| | 50 | Port4B | 4 | 3.40 |
| Port5 | 50 | Port5A | 4 | 3.40 |
| | 50 | Port5B | 3 | 3.35 |
| Port6 | 50 | Port6A | 5 | 3.45 |
| | 50 | Port6B | 2 | 3.30 |
| Port7 | 50 | Port7A | 6 | 3.50 |
| | 50 | Port7B | 1 | 3.25 |
| Port8 | 50 | Port8A | 7 | 3.55 |
| | 50 | Port8B | 0 | 3.20 |

The left side column of the table shows a port number on a common port side and the right side column shows a total loss, which includes the intersection loss when light is branched to each of the ports on the branched port side with the respective branch ratio, theoretical loss, and excess loss. The total of the theoretical loss and the excess loss is estimated as 3.2 dB approximately. Thus, as mentioned above, the intersection loss for Port1 to Port1A is zero for the number of intersections is zero, and the total loss can be estimated as 3.2 dB, which is an addition of the theoretical loss and the excess loss.

On the other hand, the number of intersection is seven for Port1 to Port1B so the intersection loss is 0.35 dB. Thus, the total loss is estimated to be 3.55 dB with the addition of the theoretical and the excess loss. So, the variation in loss per port is large as shown above and a maximum loss is large as 3.55 dB. In particular, if the intersecting splitter is made of three rows of the intersecting splitters 7a, 7b, and 7c, an intersection loss difference arises at every intersection splitter and a difference in loss may be 1.05 maximum.

However, in contrast to above, the branch ratio for each optical splitter is varied in accordance with the difference in the number of intersections of each branched waveguides.

Table 2 shows the intersection loss at each port when the branch ratio for each optical splitter is varied in accordance with the number of intersections.

TABLE 2

|  | branch ratio (%) |  | number of intersections | loss dB |
|---|---|---|---|---|
| Port1 | 48.0 | Port1A | 0 | 3.375 |
|  | 52.0 | Port1B | 7 | 3.375 |
| Port2 | 48.6 | Port2A | 1 | 3.375 |
|  | 51.4 | Port2B | 6 | 3.375 |
| Port3 | 49.1 | Port3A | 2 | 3.375 |
|  | 50.9 | Port3B | 5 | 3.375 |
| Port4 | 49.7 | Port4A | 3 | 3.375 |
|  | 50.3 | Port4B | 4 | 3.375 |
| Port5 | 50.3 | Port5A | 4 | 3.375 |
|  | 49.7 | Port5B | 3 | 3.375 |
| Port6 | 50.9 | Port6A | 5 | 3.375 |
|  | 49.1 | Port6B | 2 | 3.375 |
| Port7 | 51.4 | Port7A | 6 | 3.375 |
|  | 48.6 | Port7B | 1 | 3.375 |
| Port8 | 52.0 | Port8A | 7 | 3.375 |
|  | 48.0 | Port8B | 0 | 3.375 |

Here, the theoretical loss can be obtained by a formula: theoretical loss (dB)=−10×log(P2/P1), wherein P1 represents intensity of input light and P2 represents intensity of branched light. That is, by changing the branch ratio, the theoretical loss varies. Specifically, the theoretical loss decreases as the branch ratio (%) is increased. Thus, by using this relationship, the branch ratio of each optical splitter (100% in total) is adjusted in such a manner that a branch ratio of a side with the larger number of intersections is higher than a branch ratio of a side with the smaller number of intersections so that the total loss can be leveled.

For example, the intersection loss for Port1 to Port1A is zero, but, since the branch ratio is less than 50%, the theoretical loss is increased by that amount and the total loss, which is an addition of the theoretical loss and the excess loss, is estimated to be 3.375 dB. On the other hand, for Port1 to Port1B, the number of intersections is seven and the intersection loss is 0.35 dB. However, the branch ratio is greater than 50% so the theoretical loss is decreased by that amount and the total loss added with the theoretical loss and the excess loss is estimated to be 3.375 dB. By changing the branch ratio of each optical splitter in this way, the variation in loss per port can be reduced and the maximum loss can be suppressed to 3.375 dB.

To vary the branch ratio of optical splitters, commonly known methods such as MMI or Y branch can be used. Moreover, waveguide optimal designs such as WINC, wavefront-matching method, adjoint variable method, densimetry, or the like may also be used.

As above, in the multicast switch 1 shown in FIG. 1, the branch ratio of the optical splitter is adjusted at each row of the intersecting splitters 7a, 7b, and 7c as mentioned above so that the variation in loss per branched port can be reduced and the maximum loss can be suppressed.

Next, the switch section 5 will be described. The switch section 5 includes a plurality of switch arrays 9. For example, the ports branched by the intersecting splitter 7c are connected to switch arrays 9a and 9b respectively in the same order of the ports.

Figure 3:
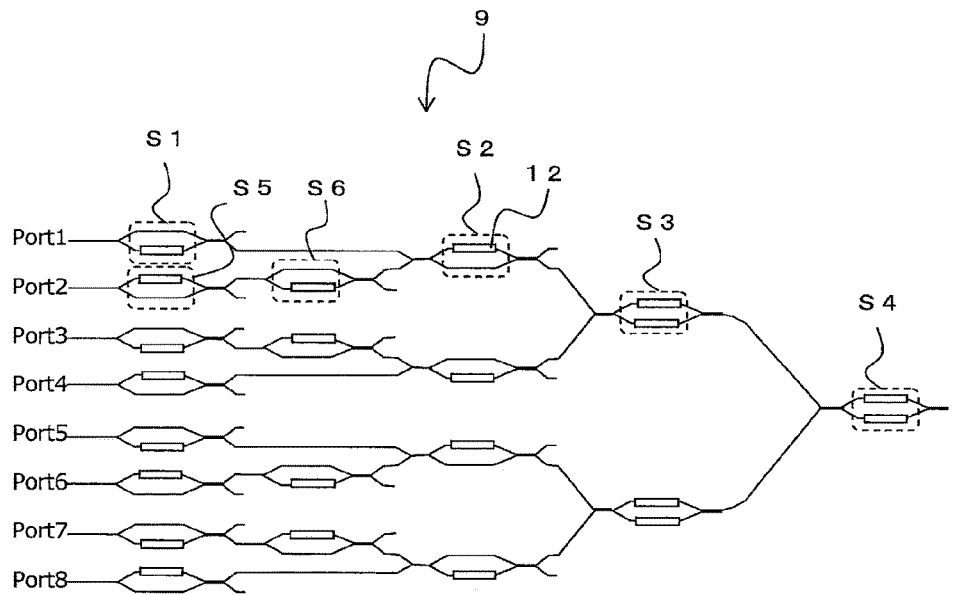
FIG. 3 is a drawing showing a switch-array 9.

FIG. 3 is a drawing showing the switch array 9. The switch array 9 is an 8×1 optical switch in a tree shape. The switch array 9 has the common ports on its one end (on the right side in the drawing) and eight branched ports on the other end (on the left side in the drawing). The switch array 9 has a plurality of optical switches 12 (MZI: Mach-Zehnder interferometers). Two waveguides are provided between input and output ports of the optical switch 12 and a heater as a heating means is provided on one of the waveguides. The switch array 9 can change the paths of optical signal by turning the heater on/off.

Here, the path that passes through the branched port (Port1) has four stages of the optical switches 12: S1, S2, S3, and S4. On the other hand, the path that passes through the branched port (Port2) has five stages of the optical switches 12: S5, S6, S2, S3, and S4. As above, to achieve a high extinction ratio, each port includes different stages. Specifically, Port1, Port4, Port5, and Port 8 include four stages of the optical switches 12, and Port2, Port3, Port6, and Port7 include five stages of the optical switches 12.

Here, the excess loss arises at every stage of the optical switch 12. For example, the excess loss per stage of the optical switch is estimated to be 0.4 dB. Thus, there is a difference of 0.4 dB in the losses between Port1, Port4, Port5, and Port 8 that include four stages of the optical switches 12 and Port2, Port3, Port6, and Port7 that include five stages of the optical switches 12.

Figure 4:
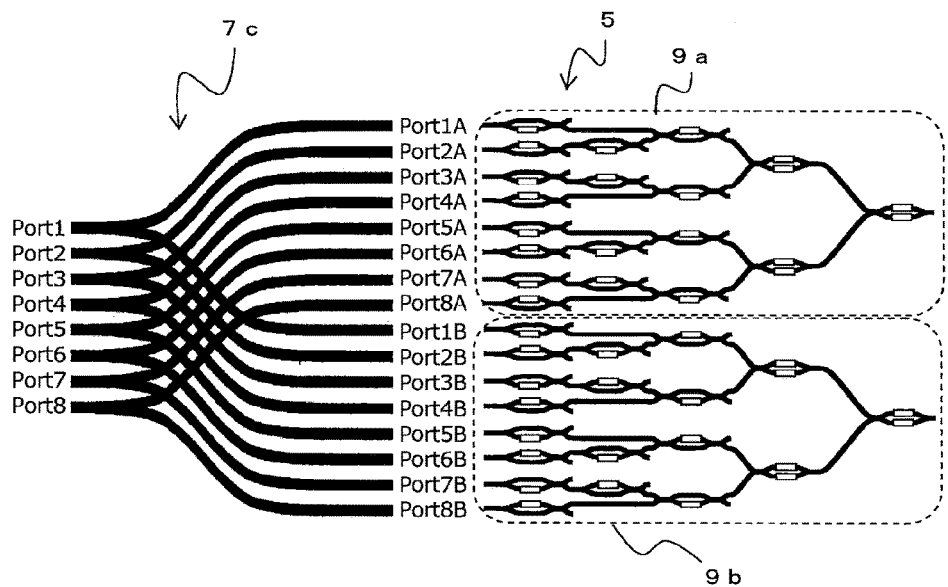
FIG. 4 (a) is a drawing showing a structure of a connection section between an intersecting splitter 7c and a switch section 5.
Figure 4:
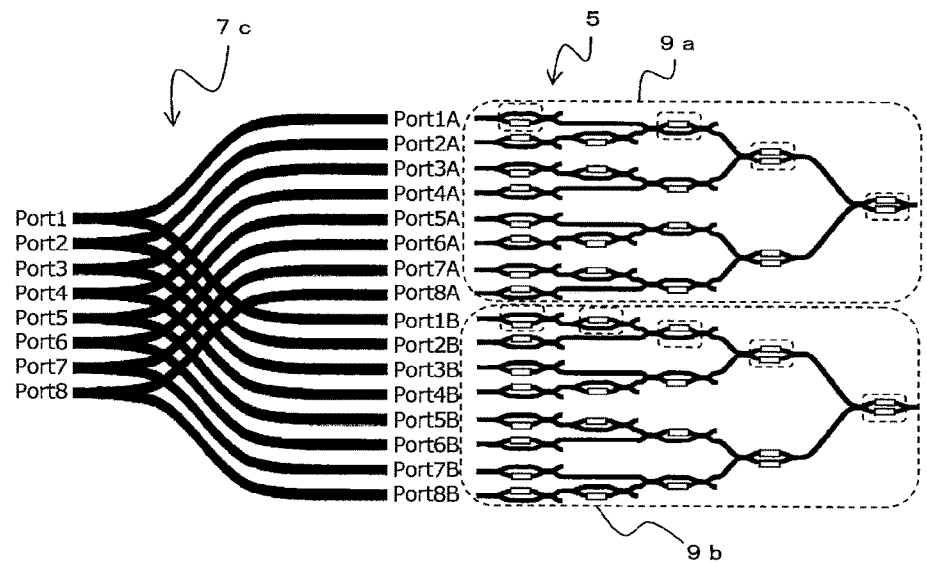

FIG. 4 (a) is a drawing showing a part of the conventional switch section 5. The ports branched by the intersecting splitter 7c are connected to the switch arrays 9a and 9b respectively. That is, the switch arrays 9a and 9b are arranged side by side and the ports of the switch arrays 9a and 9b are arranged in the same order. The ports of the switch array 9a are Port1A-Port8A and the ports of the switch array 9b are Port1B-Port8B.

Normally, as shown in FIG. 4 (a), the switch arrays 9a and 9b are formed of a same layout. Thus, Port1A, Port 1B, Port4A, Port 4B, Port5A, Port 5B, Port8A, and Port 8B include four stages of the optical switches 12. Similarly, Port2A, Port 2B, Port3A, Port 3B, Port6A, Port 6B, Port7A, and Port 7B include five stages of the optical switches 12.

Table 3 shows the excess loss at each port of the switch arrays 9a and 9b arranged as in FIG. 4 (a).

TABLE 3

|  |  | number of steps of switches | loss dB |
|---|---|---|---|
| Port1 | Port1A | 4 | 1.6 |
|  | Port1B | 4 | 1.6 |
| Port2 | Port2A | 5 | 2.0 |
|  | Port2B | 5 | 2.0 |
| Port3 | Port3A | 5 | 2.0 |
|  | Port3B | 5 | 2.0 |
| Port4 | Port4A | 4 | 1.6 |
|  | Port4B | 4 | 1.6 |
| Port5 | Port5A | 4 | 1.6 |
|  | Port5B | 4 | 1.6 |
| Port6 | Port6A | 5 | 2.0 |
|  | Port6B | 5 | 2.0 |
| Port7 | Port7A | 5 | 2.0 |
|  | Port7B | 5 | 2.0 |
| Port8 | Port8A | 4 | 1.6 |
|  | Port8B | 4 | 1.6 |

As shown in Table 3, the number of stages of the optical switches is the same for both branched ports (e.g. Port1A and Port1B) that are branched from the same common port (e.g. Port1) and thus the excess loss of each common port (e.g. Port1 and Port2) varies depending on the number of stages.

On the other hand, the layout of the switch arrays 9a and 9b arranged side by side is changed. For example, in the switch array 9a, Port1, Port4, Port5, and Port8 include four stages of the optical switches 12 and Port2, Port3, Port6, and Port7 include five stages of the optical switches 12, whereas in the switch array 9b, Port1, Port4, Port5, and Port8 include five stages of the optical switches 12 and Port2, Port3, Port6, and Port7 include four stages of the optical switches 12. In this case, the high extinction ratio can still be achieved for the both switch arrays 9a and 9b.

Table 4 shows the excess loss at each port of the switch arrays 9a and 9b arranged as in FIG. 4 (b).

TABLE 4

|  |  | number of steps of switches | loss dB |
|---|---|---|---|
| Port1 | Port1A | 4 | 1.6 |
|  | Port1B | 5 | 2.0 |
| Port2 | Port2A | 5 | 2.0 |
|  | Port2B | 4 | 1.6 |
| Port3 | Port3A | 5 | 2.0 |
|  | Port3B | 4 | 1.6 |
| Port4 | Port4A | 4 | 1.6 |
|  | Port4B | 5 | 2.0 |
| Port5 | Port5A | 4 | 1.6 |
|  | Port5B | 5 | 2.0 |
| Port6 | Port6A | 5 | 2.0 |
|  | Port6B | 4 | 1.6 |
| Port7 | Port7A | 5 | 2.0 |
|  | Port7B | 4 | 1.6 |
| Port8 | Port8A | 4 | 1.6 |
|  | Port8B | 5 | 2.0 |

As shown in Table 4, the number of stages of the optical switches is different for the branched ports (e.g. Port1A and Port1B) that are branched from the same common port (e.g. Port1). That is, the ports branched from one port by the optical splitter are connected to a plurality of the switch arrays 9a and 9b respectively and the number of stages of the optical switches in each of the switch arrays 9a and 9b to be connected is different. Thus, the sum of loss (sum of the stages) of the branched ports branched from the respective common port is the same. That is, the sum of the excess losses of PortXA and PortXB branched from PortX is: 1.6 dB+2.0 dB=3.6 dB, which is the same for all the ports.

In the present embodiments, when the sum of loss of each path (e.g. Port1A+Port1B) that passes through each branched port that are branched from the respective common port (e.g. Port1) is the same and the loss of the each branched port (e.g. Port1A and port1B) is different from one another, the total loss can be leveled by adjusting the branch ratio of the optical splitters as mentioned above.

Table 5 shows the total loss of the intersecting splitter 7c and the switch section 5 when the branch ratio of the intersecting splitter 7c is adjusted.

TABLE 5

|  | branch ratio (%) |  | number of intersections | loss dB in splitter section | number of steps of switches | loss dB in switch section | total loss dB |
|---|---|---|---|---|---|---|---|
| Port1 | 45.7 | Port1A | 0 | 3.575 | 4 | 1.6 | 5.2 |
|  | 54.3 | Port1B | 7 | 3.175 | 5 | 2.0 | 5.2 |
| Port2 | 50.9 | Port2A | 1 | 3.175 | 5 | 2.0 | 5.2 |
|  | 49.1 | Port2B | 6 | 3.575 | 4 | 1.6 | 5.2 |
| Port3 | 51.4 | Port3A | 2 | 3.175 | 5 | 2.0 | 5.2 |
|  | 48.6 | Port3B | 5 | 3.575 | 4 | 1.6 | 5.2 |
| Port4 | 47.4 | Port4A | 3 | 3.575 | 4 | 1.6 | 5.2 |
|  | 52.6 | Port4B | 4 | 3.175 | 5 | 2.0 | 5.2 |
| Port5 | 48.0 | Port5A | 4 | 3.575 | 4 | 1.6 | 5.2 |
|  | 52.0 | Port5B | 3 | 3.175 | 5 | 2.0 | 5.2 |
| Port6 | 53.2 | Port6A | 5 | 3.175 | 5 | 2.0 | 5.2 |
|  | 46.8 | Port6B | 2 | 3.575 | 4 | 1.6 | 5.2 |
| Port7 | 53.7 | Port7A | 6 | 3.175 | 5 | 2.0 | 5.2 |
|  | 46.3 | Port7B | 1 | 3.575 | 4 | 1.6 | 5.2 |
| Port8 | 49.7 | Port8A | 7 | 3.575 | 4 | 1.6 | 5.2 |
|  | 50.3 | Port8B | 0 | 3.175 | 5 | 2.0 | 5.2 |

As shown in Table 5, the total loss can be leveled by adjusting the branch ratio of each port of the intersecting splitters in such a manner that the sum of the loss from the splitter section corresponding to the number of intersections and the loss from the switch section corresponding to the number of stages of the switches is constant. Specifically, the total loss can be leveled by adjusting the branch ratio (100% in total) of each optical splitter so that the branch ratio with more stages is higher compared to the branch ratio with fewer stages. Thus, the variation in loss per port can be reduced and the maximum loss can be suppressed.

As above, by setting the branch ratios of the intersecting splitter 7c, which is to be connected with the optical switch arrays, in accordance with the number of stages of the optical switches in addition to the difference in the number of intersections of the waveguides, the variation in loss per port can be reduced. The branch ratios for the intersecting splitters 7a and 7b may be set in accordance with only the difference in the number of intersections of the waveguides.

Figure 5:
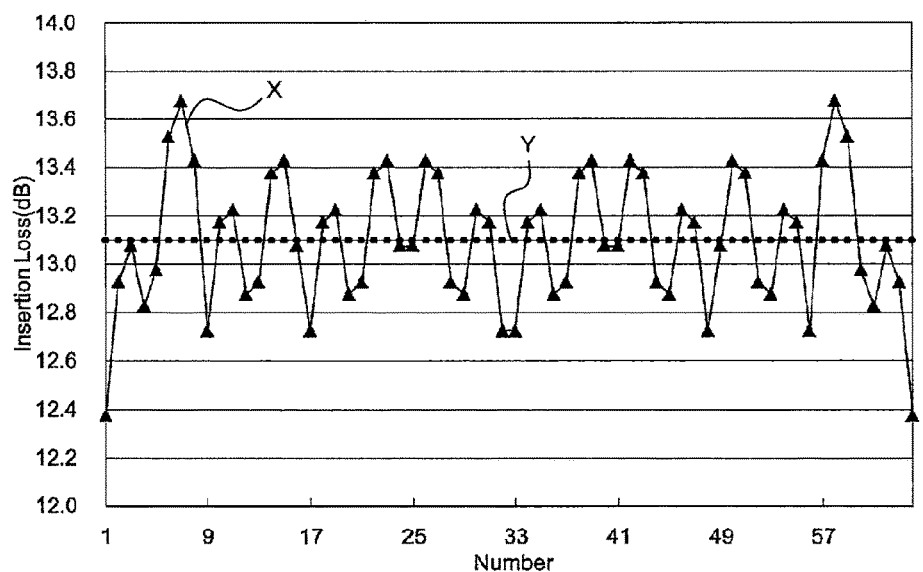
FIG. 5 is a graph showing calculated values of variation in loss per port.

FIG. 5 is a graph showing the calculated variation in loss of each path. The horizontal axis is the path number (8×8=64 paths) and the vertical axis is the total loss. X in the graph is for the conventional one in which all the branch ratios of the optical splitters are 50%/50%. On the other hand, Y in the drawing is for the one in which the branch ratios of the intersecting splitters are adjusted in accordance with the number of intersections of the intersecting splitters and the number of stages of the switches of the switch arrays.

As shown in the graph, the conventional method has a larger variation in loss per path and its maximum loss is large as well. In contrast, the presently described embodiments can eliminate the variation in loss theoretically and suppress the maximum loss.

As above, according to the present embodiment, varying the branch ratios according to the difference in the number of intersections of respective waveguides branched by the intersecting splitter 7 can reduce the variation in loss due to the difference in the number of intersections in the intersecting splitters and suppress the maximum loss.

Furthermore, having different switch arrangements for the switch arrays 9a and 9b, which are provided side by side, allows the switch arrays 9a and 9b, which are connected to the respective port branched from the same one port, to have different number of stages of the optical switches. This enables the total losses of the paths that pass through the branched ports branched from the respective common port to be uniform. In this way, the branch ratios for the intersecting splitter 7c can be adjusted taking the number of stages of the switches in the switch arrays into consideration. As a result, the variation in loss due to the difference in the number of stages of the switch arrays can be reduced and the maximum loss can be suppressed.

The layout of the switch arrays 9a and 9b is not limited to the tree shaped layout as described above. For example, the switch arrays 9a and 9b may be in a tandem arrangement.

Figure 6:
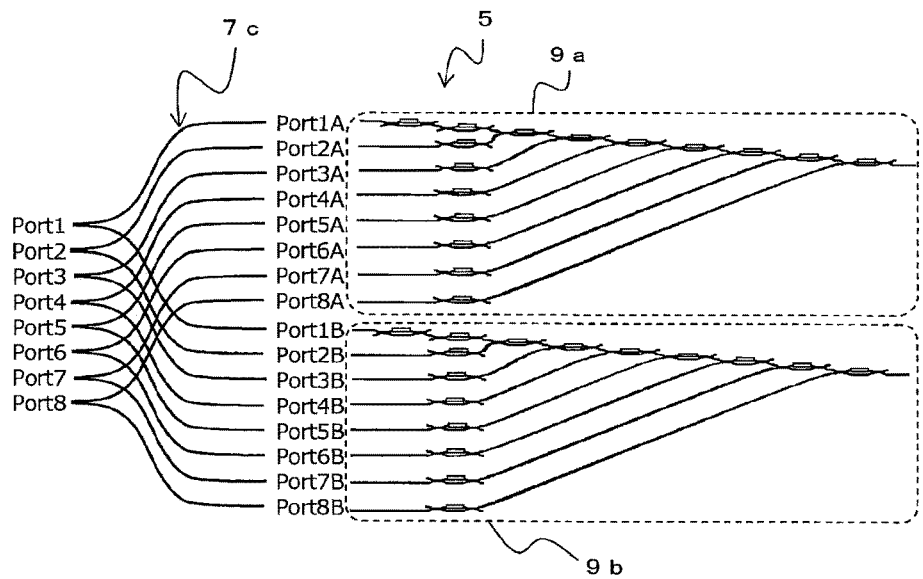
FIG. 6 (a) is a drawing showing a structure of a connection section between an intersecting splitter 7c and a switch section 5.
Figure 6:
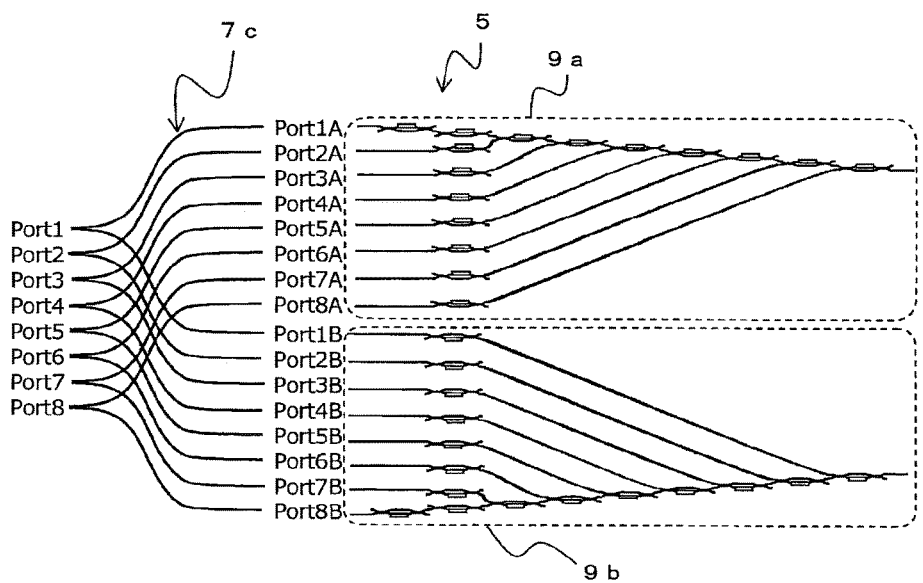

FIG. 6 (*a*) is a drawing showing a part of the switch section 5 in a conventional tandem arrangement. The ports branched by the intersecting splitter 7c are connected to the switch arrays 9a and 9b, respectively. That is, the switch arrays 9a and 9b are arranged side by side and the ports of the switch arrays 9a and 9b are in the same order.

Normally, as shown in FIG. 6 (*a*), the switch arrays 9a and 9b are formed of the same layout. Thus, as mentioned above, the total number of stages of the optical switches 12 varies with Port1-Port8.

Table 6 shows the excess loss at each port of the switch arrays 9a and 9b in the arrangement as in FIG. 6 (*a*).

TABLE 6

|  |  | number of steps of switches | loss dB |
|---|---|---|---|
| Port1 | Port1A | 9 | 3.6 |
|  | Port1B | 9 | 3.6 |
| Port2 | Port2A | 8 | 3.2 |
|  | Port2B | 8 | 3.2 |
| Port3 | Port3A | 7 | 2.8 |
|  | Port3B | 7 | 2.8 |
| Port4 | Port4A | 6 | 2.4 |
|  | Port4B | 6 | 2.4 |
| Port5 | Port5A | 5 | 2.0 |
|  | Port5B | 5 | 2.0 |
| Port6 | Port6A | 4 | 1.6 |
|  | Port6B | 4 | 1.6 |
| Port7 | Port7A | 3 | 1.2 |
|  | Port7B | 3 | 1.2 |
| Port8 | Port8A | 2 | 0.8 |
|  | Port8B | 2 | 0.8 |

As shown in Table 6, the number of stages of the optical switches is the same for both branched ports (e.g. Port1A and Port1B) that are branched from the same common port (e.g. Port1) and thus the excess loss of each common port (e.g. Port1 and Port2) varies depending on the number of stages.

On the other hand, the layout of the switch arrays 9a and 9b provided side by side is changed in the described embodiments. For example, in the switch array 9a, Port1, Port2, . . . , Port7, and Port8 include nine, eight, . . . , three, and two stages of the optical switches 12, whereas in the switch array 9b, Port1, Port2, . . . , Port7 and Port8 include two, three, . . . , eight, and nine stages of the optical switches 12.

Table 7 shows the excess loss at each port of the switch arrays 9a and 9b arranged as in FIG. 6 (*b*).

TABLE 7

|  |  | number of steps of switches | loss dB |
|---|---|---|---|
| Port1 | Port1A | 9 | 3.6 |
|  | Port1B | 2 | 0.8 |
| Port2 | Port2A | 8 | 3.2 |
|  | Port2B | 3 | 1.2 |
| Port3 | Port3A | 7 | 2.8 |
|  | Port3B | 4 | 1.6 |
| Port4 | Port4A | 6 | 2.4 |
|  | Port4B | 5 | 2.0 |
| Port5 | Port5A | 5 | 2.0 |
|  | Port5B | 6 | 2.4 |
| Port6 | Port6A | 4 | 1.6 |
|  | Port6B | 7 | 2.8 |
| Port7 | Port7A | 3 | 1.2 |
|  | Port7B | 8 | 3.2 |
| Port8 | Port8A | 2 | 0.8 |
|  | Port8B | 9 | 3.6 |

As shown in Table 7, although the number of stages of the optical switches is different for the branched ports (e.g. Port1A and Port1B) that are branched from the same common port (e.g. Port1), the sum of loss (sum of the stages) of the branched ports branched from the respective common port is the same. That is, the sum of the excess losses of PortXA and PortXB branched from PortX is 4.4 dB, which is the same for all the ports.

In the present embodiments, when the sum of loss of each path (e.g. Port1A+Port1B) that passes through each branched port that are branched from the respective common port (e.g. Port1) is the same and the loss of the each branched port (e.g. Port1A and port1B) is different from one another, the total loss can be leveled by adjusting the branch ratio of the optical splitter as mentioned above.

Table 8 shows the total loss of the intersecting splitter 7c and the switch section 5 when the branch ratio of the intersecting splitter 7c is adjusted.

TABLE 8

|  | branch ratio (%) |  | number of intersections | loss dB in splitter section | number of steps of switches | loss dB in switch section | total loss dB |
|---|---|---|---|---|---|---|---|
| Port1 | 45.7 | Port1A | 0 | 3.575 | 4 | 1.6 | 5.2 |
|  | 54.3 | Port1B | 7 | 3.175 | 5 | 2.0 | 5.2 |
| Port2 | 50.9 | Port2A | 1 | 3.175 | 5 | 2.0 | 5.2 |
|  | 49.1 | Port2B | 6 | 3.575 | 4 | 1.6 | 5.2 |
| Port3 | 51.4 | Port3A | 2 | 3.175 | 5 | 2.0 | 5.2 |
|  | 48.6 | Port3B | 5 | 3.575 | 4 | 1.6 | 5.2 |
| Port4 | 47.4 | Port4A | 3 | 3.575 | 4 | 1.6 | 5.2 |
|  | 52.6 | Port4B | 4 | 3.175 | 5 | 2.0 | 5.2 |
| Port5 | 48.0 | Port5A | 4 | 3.575 | 4 | 1.6 | 5.2 |
|  | 52.0 | Port5B | 3 | 3.175 | 5 | 2.0 | 5.2 |

TABLE 8-continued

|  | branch ratio (%) |  | number of intersections | loss dB in splitter section | number of steps of switches | loss dB in switch section | total loss dB |
|---|---|---|---|---|---|---|---|
| Port6 | 53.2 | Port6A | 5 | 3.175 | 5 | 2.0 | 5.2 |
|  | 46.8 | Port6B | 2 | 3.575 | 4 | 1.6 | 5.2 |
| Port7 | 53.7 | Port7A | 6 | 3.175 | 5 | 2.0 | 5.2 |
|  | 46.3 | Port7B | 1 | 3.575 | 4 | 1.6 | 5.2 |
| Port8 | 49.7 | Port8A | 7 | 3.575 | 4 | 1.6 | 5.2 |
|  | 50.3 | Port8B | 0 | 3.175 | 5 | 2.0 | 5.2 |

As shown in Table 8, the total loss can be leveled by adjusting the branch ratio of each port of the intersecting splitters in such a manner that the sum of the loss from the splitter section corresponding to the number of intersections and the loss from the switch section corresponding to the number of stages of the switches is constant.

As above, even if the switch section 5 is in the tandem arrangement, setting the branch ratios of the intersecting splitter 7c in accordance with the difference in the number of stages of the optical switches in addition to the difference in the number of intersections of the waveguides as in the case of the tree arrangement can reduce the variation in loss per port. The branch ratios for the intersecting splitters 7a and 7b may be set in accordance with only the difference in the number of intersections of the waveguides as mentioned above.

(Second Embodiment)

Figure 7:
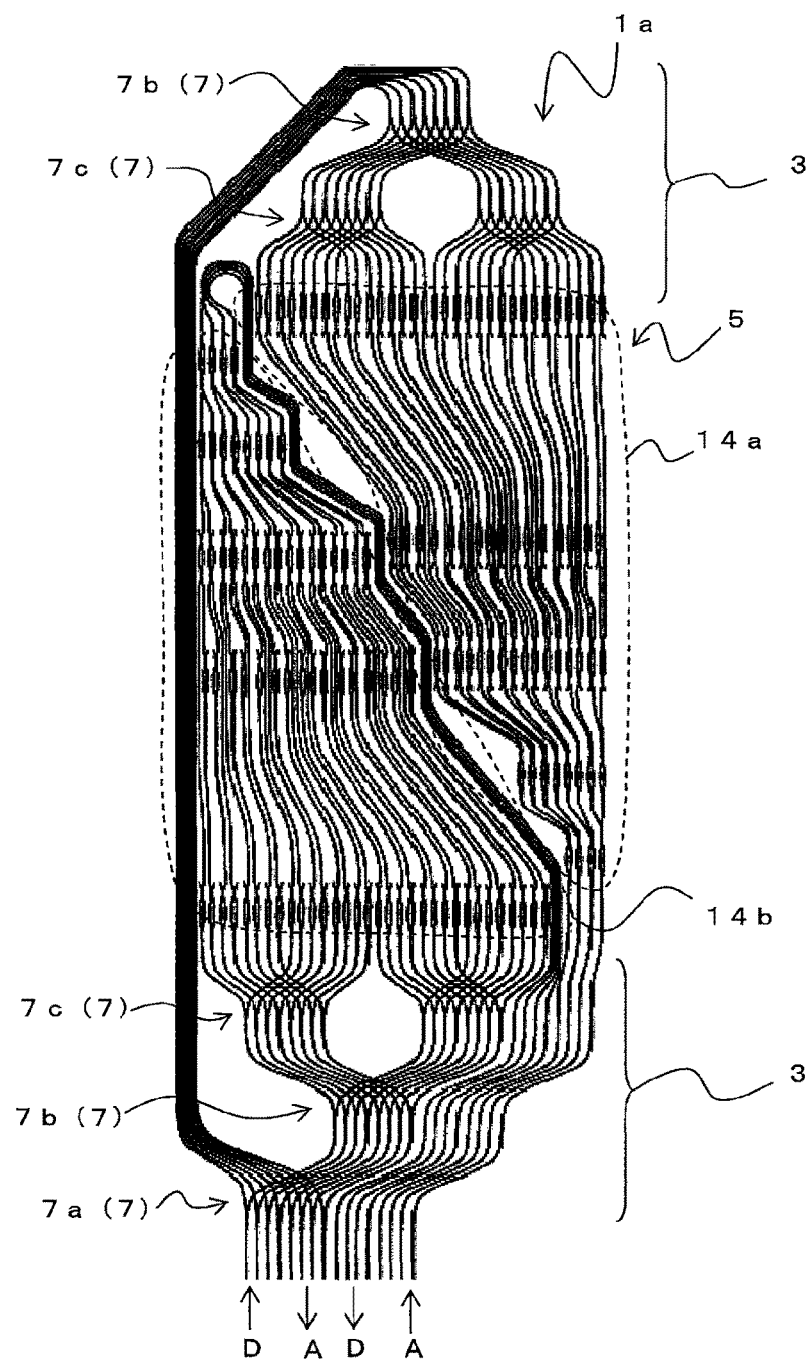

Next, a second embodiment will be described. FIG. 7 is a drawing showing a multicast switch 1a. In the descriptions hereinafter, the same notations will be used for the same functions as the first embodiment shown in FIG. 1 to FIG. 6 (a), (b) and redundant descriptions will be omitted. Also, although an example in which the switch arrays 9a and 9b are in the tree arrangement will be described, the above-mentioned tandem arrangement is also acceptable.

The multicast switch 1a has the approximately same structure as the multicast switch 1 except that the layout of the waveguides is different. Similarly to the multicast switch 1, the splitter section 3 of the multicast switch 1a according to the present embodiment includes the first row of intersecting splitter 7a, the second row of intersecting splitter 7b, and the third row of intersecting splitter 7c provided in sequence from the splitter side ports that input and output signal light to/from the splitter section 3.

One part of the waveguides branched by the intersecting splitter 7a is lead in an upward direction in the drawing (hereinafter, represented as the forward direction) to be connected with the switch section 5 with the intersecting splitters 7b and 7c disposed in that order. The other part of the waveguides branched by the intersecting splitter 7a is lead to an opposite side of the board (the upper side in the drawing) and inverted to be connected with the switch section 5 with the intersecting splitters 7b and 7c disposed in a reverse direction of the forward direction (downward direction in the drawing and represented as the reverse direction hereinafter) in that order. Thus, the splitter section 3 is divided into two parts.

The switch section 5 is divided into a pair of switch array groups 14a and 14b. Each of the switch array groups 14a and 14b includes at least one switch array (the switch array groups 14a and 14b include four switch arrays respectively in the example shown in the drawing).

The switch array group 14b is connected with the intersecting splitter 7c (the intersecting splitter 7c on the lower side of the drawing), which is connected with the intersecting splitter 7b in the forward direction, and the waveguides of the switch array group 14b (four waveguide paths in the drawing) are inverted at the common port side and lead in the reverse direction to the side face of the board (lower side in the drawing). The switch array group 14a is connected with the intersecting splitter 7c (the intersecting splitter 7c on the upper side of the drawing), which is connected with the intersecting splitter 7b in the reverse direction, and the waveguides of the switch array group 14a (four waveguide paths in the drawing) at the common port side are formed being kept toward the reverse direction and lead to the side face of the board (lower side in the drawing).

That is, in the multicast switch 1a, the splitter side ports, which input/output signal light to/from the splitter section, and the switch side ports, which input/output signal light to/from the switch section, are disposed on the same side face of the board.

Here, the switch array groups 14a or 14b according to the present embodiment is in substantially right-angled triangle shapes as a whole. As shown in the drawing, a bottom side of the right-angled triangle (the shortest side of the right-angled triangle, which is the side of 32 branched ports in the example shown in the drawing) is connected with the intersecting splitter 7c. That is, the intersecting splitters 7c and 7b are disposed in sequence at the bottom side of the right-angled triangle of each of the switch array groups 14a and 14b.

Also, the switch array group 14a and the other switch array group 14b are disposed in an inverted direction with the oblique sides thereof facing each other on the board. Thus, a substantially rectangular switch section 5 can be obtained by combining the switch array groups 14a and 14b. The waveguides of the switch array group 14b from the common port side to the side face of the board are formed between the switch array group 14a and the switch array group 14b.

In the switch array groups 14a and 14b according to the present embodiment, the waveguides and the optical switches are drawn to a vertical side of the right-angled triangle (the second shortest side of the right-angled triangle). Thus, the extra space in which there are no waveguides or optical switches disposed can be gathered to the oblique side of the right-angled triangle. Arranging the switch array group 14a and the switch array group 14b having such structures on each other's extra space in an inverted direction and in parallel can decrease the extra space where there are no waveguides or optical switches and can reduce an area of the switch section 5.

Also in the multicast switch 1a, as mentioned above, the branch ratio of each port is adjusted according to the difference in the number of intersections for the intersecting splitters 7a and 7b, and the branch ratio of each port is adjusted in accordance with the difference in the number of intersections and the difference in the number of stages of switches for the intersecting splitters 7c so that the same effects as in the multicast switch 1 can be obtained.

According to the second embodiment, the same effects as in the first embodiment can be obtained. Furthermore, downsizing of the multicast switch can be achieved.

(Third Embodiment)

Figure 8:
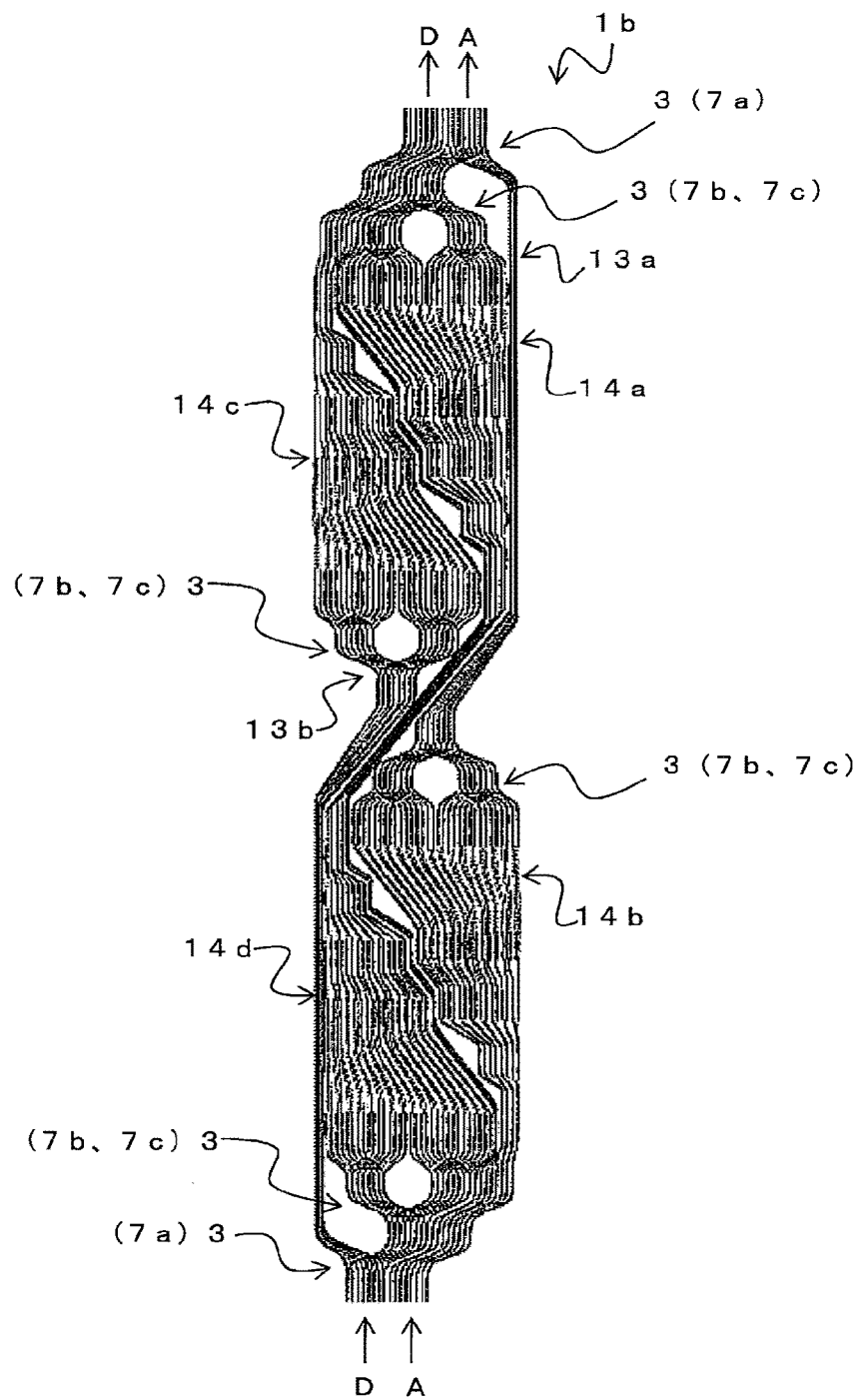
FIG. 8 is a drawing showing a multicast switch 1b.

Next, a third embodiment will be described. FIG. 8 is a drawing showing a multicast switch 1b. The multicast switch 1b has an approximately similar structure as the multicast switch 1a except that a multicast switch for add 13a and a multicast switch for drop 13b are both disposed on the same board.

The multicast switch for add 13a and the multicast switch for drop 13b are divided into a pair of switch array groups as in the multicast switch 1a.

The switch array groups 14a and 14b of the multicast switch for add 13a are disposed in tandem facing toward the same direction. Here, 'disposed in tandem' means that the switch array groups 14a and 14b are positioned so that the switch array groups 14a and 14b are lined up in a direction of a straight line connecting the branched ports and the common ports of each of the switch array groups 14a and 14b.

The waveguides that are to be connected to the eight ports on an input side of the multicast switch for add 13a (the ports on the side of the switches at the lower side of the drawing) are divided into two parts, and four of the waveguides are connected to the common port side of the switch array group 14b. The other four waveguides are lead along the switch array group 14b (the multicast switch for add 13a) to the back of the switch array group 14b (the upper part in the drawing) and connected to the common port side of the switch array group 14a.

Also, the eight waveguides that are to be connected via the splitter section 3 (the intersecting splitters 7c and 7b) to the branched ports of the switch array group 14b are lead along the switch array group 14a to the back of the switch array group 14a (the upper part in the drawing). Moreover, these waveguides are coupled via the intersecting splitter 7a to the eight waveguides that are to be connected via the splitter section 3 (the intersecting splitters 7c and 7b) with the branched ports of the switch array group 14a. That is, the eight output side ports of the multicast switch for add 13a (the ports on the splitter side in the upper part of the drawing) and the input side ports of the multicast switch for add 13a are formed on each side face of the board, facing each other.

Similarly, the switch array groups 14c and 14d of the multicast switch for drop 13b are disposed in tandem facing toward the same direction. The waveguides that are to be connected to the eight input side ports of the multicast switch for drop 13b (the ports on the side of the splitters at the lower side of the drawing) are divided into two parts via the intersecting splitter 7a, and eight of the waveguides are connected to the branched port side of the switch array group 14b via the intersecting splitters 7b and 7c. The other eight waveguides are lead along the switch array group 14d to the back of the switch array group 14d (the upper part in the drawing) and connected to the branched port side of the switch array group 14c via the intersecting splitters 7b and 7c.

Also, four of the waveguides that are to be connected with the common port of the switch array group 14d is lead along the switch array group 14c to the back of the switch array group 14c (the upper part in the drawing). Also, these waveguides and the four waveguides that are to be connected with the common port of the switch array group 14c are lead to the side face of the board so as to be the output side ports for the multicast switch for drop 13b (the ports on the switch side in the upper part of the drawing). That is, the eight output side ports for the multicast switch for drop 13b (the ports on the switch side in the upper part of the drawing) and the input side ports for the multicast switch for drop 13b are formed on the side faces of the board facing each other.

In the multicast switch 1b, the input side ports for the multicast switch for drop 13b and the input side ports for the multicast switch for add 13a are provided side by side on one side face of the board. Also, on the other side face of the board, which is opposite thereto, the output side ports for the multicast switch for drop 13b and the output side ports for the multicast switch for add 13a are provided side by side. In this way, the input ports for the multicast switch for drop 13b and the each switch array group of the multicast switch for add 13a are disposed in the directions inverted to each other.

The switch array groups 14a, 14b, 14c, and 14d are shaped in substantially right-angled triangles. As shown in the drawing, the bottom side of the right-angled triangle (the shortest side of the right-angled triangle, which is the side of 32 branched ports in the example shown in the drawing) is connected to the intersecting splitter 7c. That is, the intersecting splitters 7c and 7b are disposed in sequence on the each bottom side of the right-angled triangle of the switch array groups 14a and 14b.

As mentioned above, the switch array groups 14a and 14b are disposed in tandem facing toward the same direction and the switch array groups 14c and 14d are disposed in tandem facing toward the same direction. The switch array group 14a and the switch array group 14c are provided side by side being inverted so that the oblique sides thereof face each other on the board. Also, the switch array group 14b and the switch array group 14d are provided side by side being inverted so that the oblique sides thereof face each other on the board.

Combining the switch array groups 14a and 14c in this way makes the switch section 5 substantially rectangular, and combining the switch array groups 14b and 14d makes the switch section 5 substantially rectangular.

In the switch array groups 14a, 14b, 14c, and 14d according to the present embodiment, the waveguides and the optical switches are drawn to the vertical side of the right-angled triangle (the second shortest side of the right-angled triangle). Thus, the extra space in which there are no waveguides or optical switches disposed can be gathered to the oblique side of the right-angled triangle. Arranging the switch array group 14a with the switch array group 14c and the switch array group 14b with the switch array group 14d having such structures on each other's extra space in an inverted direction and in parallel can decrease the extra space where there are no waveguides or optical switches and can reduce the area of the switch section 5.

In the multicast switch 1b, as mentioned above, the branch ratio of each port is adjusted in accordance with the difference in the number of intersections for the intersecting splitters 7a and 7b, and the branch ratio of each port is adjusted in accordance with the difference in the number of intersections and the difference in the number of stages of switches for the intersecting splitters 7c so that the same effects as in the multicast switch 1 can be obtained.

According to the third embodiment, the same effects as in the second embodiment can be obtained. Furthermore, the multicast switch for add 13a and the multicast switch for drop 13b can be efficiently disposed on the same board.

<Multicast Switch Module>

(First Embodiment)

Figure 9:
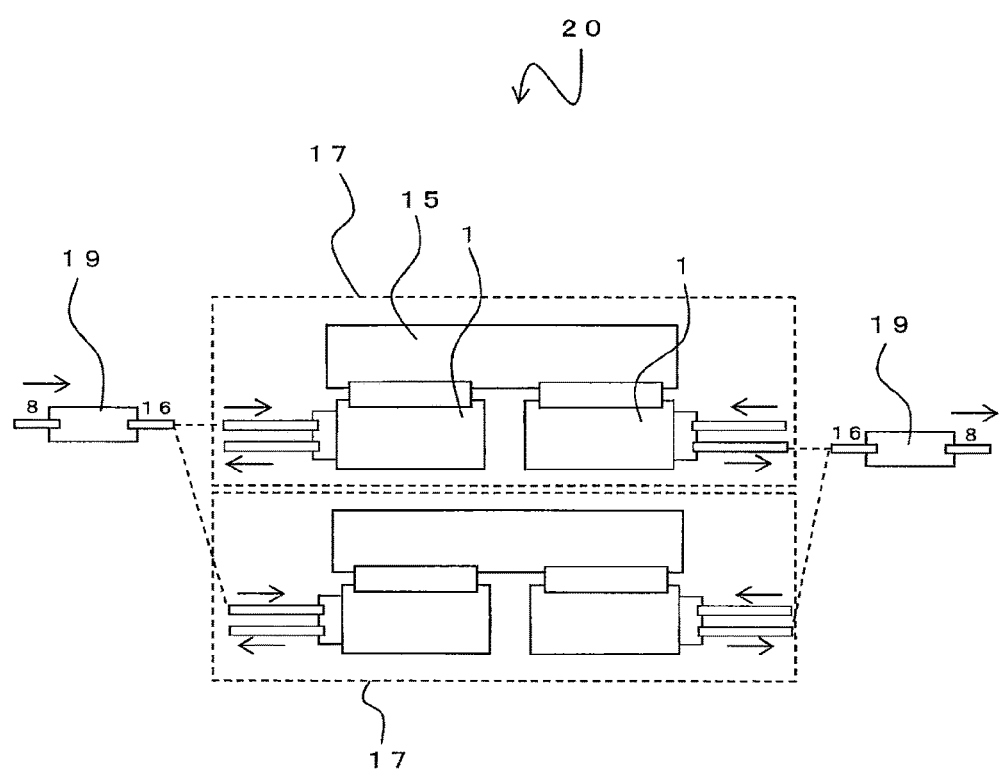
FIG. 9 is a drawing showing a multicast switch module 20.

Next, a multicast switch module using the above-mentioned multicast switch will be described. FIG. 9 is a block diagram showing a multicast switch module 20. The multicast switch module 20 includes a plurality of dual-type MCS (multicast switch) units 17, splitters 19, and the like.

The dual-type MCS unit 17 includes a pair of the multicast switches 1 and a control board 15. The pair of the multicast switches 1 are used for add and drop port, respectively. Alternatively, the multicast switch 1a may be applied in place of the multicast switch 1.

The pair of the multicast switches 1 are connected with the control board 15. To connect the multicast switches 1 and the control board 15, for example, anisotropic conductive film, anisotropic conductive paste, or the like can be used. The control board 15 controls the multicast switches 1. That is, the control board 15 can control the optical paths by controlling the each optical switch of the multicast switch 1. It should be noted that one control board 15 is able to control the pair of the multicast switches 1.

The multicast switch 1 and the splitter 19 are connected via optical fibers. Here, as mentioned above, increasing the relative refractive index difference Δ between the core and the cladding of an optical waveguide is effective in downsizing the multicat switch 1. For example, a technique in which zirconia ($ZrO_2$) is used as a dopant for raising the refractive index has been commonly known.

However, when the relative refractive index difference Δ between the core and the cladding of an optical waveguide is increased, confinement of light becomes stronger and thus the core size for achieving single mode transmission is decreased and, subsequently, the diameter of the optical beam that transmits in the core becomes smaller. This may lead to increase a connection loss between multicast switch 1 in which optical waveguides are formed and the single mode optical fiber (an optical fiber having zero dispersion wavelength in 1.3 μm band, based on ITU-T G.652) that inputs/outputs light to/from the multicast switch 1.

Thus, in the present embodiment, the multicast switch 1 and the single-mode optical fiber are not directly connected but are connected via an optical fiber with a high relative refractive index difference. For example, an optical element with a high relative refractive index difference, in which the relative refractive index difference Δ of core to cladding is between 2.5% and 10%, is used for the multicast switch 1, and the optical fiber with a high relative refractive index difference (of which the mode field diameter is 3-5 μm in 1550 nm, for example) has a relative refractive index difference Δ of core to cladding between 2.0% and 3.0%. This enables to decrease the connection loss. Also, the relative refractive index difference Δ is defined as: $\Delta = \{(n_{cl} - n_c)/n_{cl}\} \times 100$ wherein $n_{cl}$ is a maximum refractive index of the core and $n_c$ is a refractive index of the cladding. Also, the modefield diameter and the other terms that are not specifically defined in the present descriptions are subject to appropriate definintions and measurement methods defined in ITU-T (International Telecommunication Union Telecommunication Standardization Sector) G. 650. 1.

The splitter 19 branches or merges the input/output ports to the respective dual-type MCS unit 17. As shown in the drawing, when using the two dual-type MCS units 17 including the 8×8 multicast switch 1, a pair of the splitters 19 including a 1×2 splitter is used. The number of the dual-type MCS unit 17 is not limited to two, and three or more may be included. In such a case, the splitter 19 can be increased as 1×3, 1×4, and so on. Thus, it is possible to add the dual-type MCS units 17 easily by changing only the splitter 19. That is, as the number of the dual-type MCS unit increases as 2, 3, 4, and so on, the dual-type MCS units of 8×16, 8×24, 8×32, and so on can be obtained.

The intersecting splitter may also be applied to the splitter 19. In this case, as mentioned above, setting the branch ratio in accordance with the difference in the number of intersections can reduce the variation in loss per port and suppress the maximum loss.

Also, although 8×1 switch is used in the present embodiment, it is not limited thereto and 4×1 or 16×1 switch may also be used.

As above, according to the present embodiment, a small-sized multicast switch module with a small variation in loss per port and the small maximum loss can be obtained.

(Second Embodiment)

Figure 10:
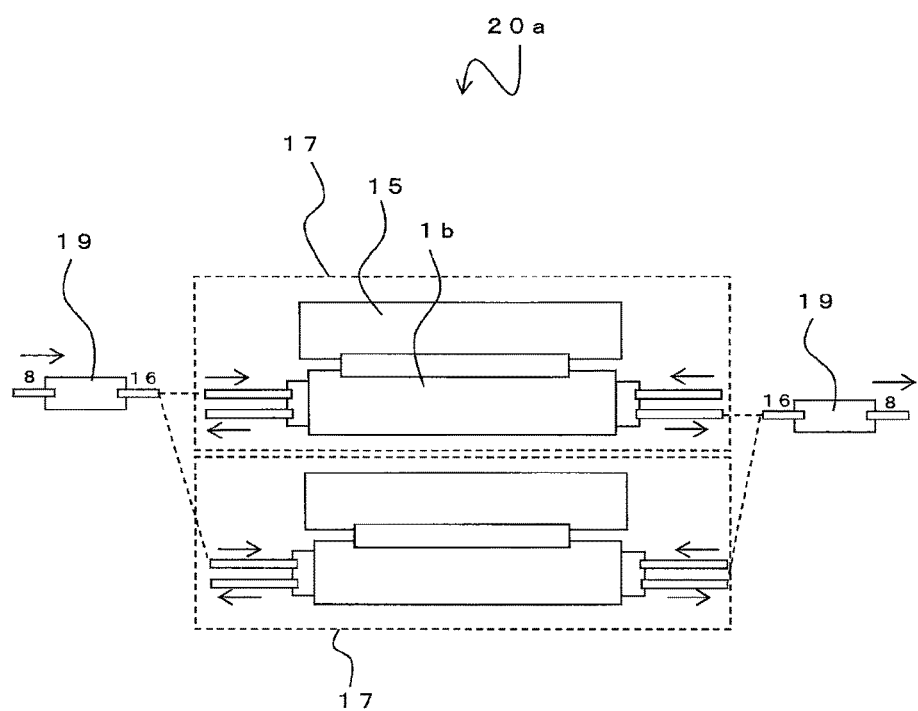

Next, a second embodiment will be described. FIG. 10 is a drawing showing a multicast switch module 20a. In the descriptions below, the same notations will be used for the same functions as the first embodiment shown in FIG. 9 and redundant descriptions will be omitted.

The multicast switch module 20a has approximately the same structure as the multicast switch module 20 except that the multicast switch 1b is used therein. As mentioned above, the multicast switch 1b has the multicast switch for add 13a and the multicast switch for drop 13b disposed on a same board. For this reason, the control board 15 in the dual-type MCS unit 17 of the present embodiment is connected with the one multicast switch 1b.

Also in this case, the splitter 19 connects each of the dual-type MCS units 17. Thus, easy extension is possible using a plurality of the dual-type MCS units 17.

According to the second embodiment, the same effects as in the first embodiment can be obtained. Also, downsizing of the dual-type MCS unit 17 can be achieved.

[Working Examples]

Next, a multicast switch according to the presently described embodiments has been actually manufactured and the variation in loss has been measured. First, waveguides are formed using PLC manufacturing process technologies such as FHD method, photolithography, reactive ion etching, or the like, and then a heater and electrodes are formed to obtain a chip for an 8×8 multicast switch with a relative refractive index difference Δ of 5%. To downsize the chip, the waveguides are arranged similarly as in the multicast switch 1a shown in FIG. 7. Consequently, the chip is downsized to 30×9 mm.

The branch ratios of the optical splitters corresponding to the intersecting splitters 7a and 7b are adjusted in accordance with the difference in the number of intersections so that the output light of each splitter has the same power. Also, the adjacent 8×1 switch arrays are arranged so that the number of stages of the switch per port is different. Furthermore, the branch ratio of the intersecting splitter 7c is adjusted taking the difference in the number of stages of the switches in addition to the difference in the number of intersections into consideration.

Figure 11:
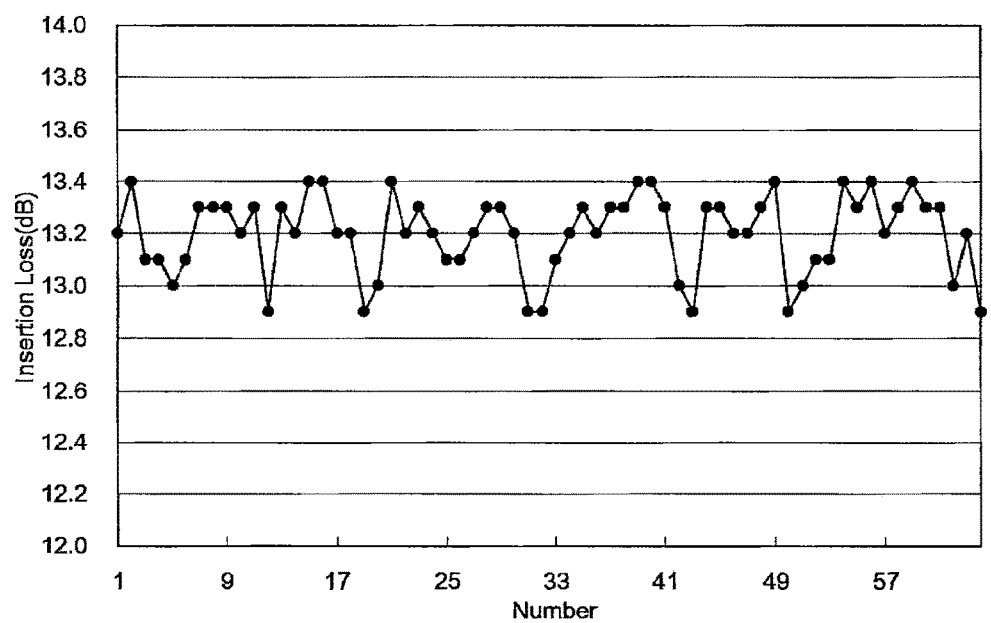
FIG. 11 is a graph showing measured values of variation in loss per port.

FIG. 11 is a graph showing the variation in loss for each path of the multicast switch with adjusted branch ratios. The variation in loss is approximately 0.5 dB maximum and the maximum loss can be reduced down to 13.44 dB.

In the intersecting splitters, each optical splitter has a different branch ratio depending on the number of intersections of the waveguides. For example, for a branching part between a port with less intersections with relatively small intersecting loss and a port with more intersections with relatively large intersecting loss, light is branched with a greater ratio to a side with larger intersection loss so that the total loss can be leveled.

Also, according to the multicast switch, the variation in loss per port is small and a multicast switch with a small maximum loss can be obtained.

Here, usually, to achieve a high extinction ratio, each port in the switch arrays includes different stages of optical switches for each port. Thus, the excess loss for one stage of the optical switches is varied per port.

On the other hand, when providing a plurality of the switch arrays side by side, the same switch arrays are usually used, and thus the layout of the optical switches in the switch arrays arranged side by side is the same. Thus, in each of the switch arrays that are provided side by side, for example, Port1, Port4, Port5, and Port 8 include four stages, and Port2, Port3, Port10, and Port7 include five stages and the like. Thus, the excess loss is different between Port 1, 4, 5, 8 and Port 2, 3, 6, 7.

However, waveguides branched by the intersecting splitters are connected to each port of the plurality of the switch arrays and the optical switches are disposed so that the number of stages of the optical switches varies in the switch arrays corresponding to the respective port. That is, every port branched by the intersecting splitters is connected to the switch arrays of four and five stages. Thus, the difference in excess loss according to the number of stages of the optical switches can be eliminated in advance by the branch ratios of the intersecting splitters.

In the multicast switch that is structured as above, disposing a pair of the optical switch array groups that are to be provided on a board side by side inverted to each other facing each other enables to reduce waste space on the board and obtain a high-density multicast switch.

Also, according to the multicast switch module, a multicast switch module that can easily change the number of wavelengths can be obtained.

Although the embodiments have been described referring to the attached drawings, the technical scope of the present disclosure is not limited to the embodiments described above. It is obvious that persons skilled in the art can think out various examples of changes or modifications within the scope of the technical idea described in this specification, and it will be understood that they naturally belong to the technical scope of the present claims.

What is claimed is:

1. A multicast switch comprising:
a splitter section including an intersecting splitter, the intersecting splitter comprising a plurality of optical splitters, wherein at least some of waveguides included in the plurality of the optical splitters intersect with each other on a plane;
a switch section that is connected to the splitter section and includes a switch array for selecting paths for optical signals, wherein the switch section includes:
a plurality of switch arrays, wherein each of the switch arrays includes a plurality of stages of optical switches,
wherein each port that is branched from one same port by the optical splitters is connected to each of the plurality of the switch arrays, wherein a number of the stages of the optical switches in each of the switch arrays connected to each port varies, and
wherein a branch ratio of at least some of the optical splitters is set in accordance with a difference in the number of stages of the optical switches and a difference in the number of intersections of the waveguides; and
a board on which the splitter section and the switch section are disposed,
wherein the branch ratio is set in such a manner that a branch ratio of a side with a larger number of intersections is higher than a branch ratio of a side with a smaller number of intersections; and
wherein the branch ratio is set in such a manner that a branch ratio of a side with a larger number of stages is higher than a branch ratio of a side with a smaller number of stages.

2. The multicast switch according to claim 1, wherein:
a splitter-side port, which inputs and outputs signal light to/from the splitter section, and a switch side port, which inputs and outputs signal light to/from the switch section, are disposed on a same side face of the board; and
a plurality of the switch arrays are divided into a pair of switch-array groups and one of the switch-array groups and the other of the switch-array groups are arranged on the board in directions inverted to each other.

3. The multicast switch according to claim 1, wherein:
a multicast switch for add and a multicast switch for drop are disposed on the same board;
splitter side ports, which input and output signal light to/from the splitter section of the multicast switch for add, and switch side ports, which input and output signal light to/from the switch section of the multicast switch for drop, are disposed on one side face of the board;
switch side ports of the multicast switch for add and splitter side ports of the multicast switch for drop are disposed on the other side face of the board;
a plurality of the switch arrays of the multicast switch for add are divided into a pair of switch-array groups and one of the switch-array groups and the other of the switch-array groups are arranged on the board in tandem facing toward a same direction;
a plurality of the switch arrays of the multicast switch for drop are divided into a pair of switch-array groups and one of the switch-array groups and the other of the switch-array groups are arranged on the board in tandem facing toward a same direction; and
the multicast switch for add and the multicast switch for drop are disposed in directions inverted to each other.

4. A multicast switch module comprising:
a plurality of dual-type MCS units that are provided side by side, each of the dual-type MCS units comprising a pair of the multicast switches according to claim 1 and a control section that controls the multicast switches; and
a splitter that branches or merges signal light to each of the multicast switches of each of the dual-type MCS units.

5. A multicast switch module comprising:
a plurality of dual-type MCS units that are provided side by side, each of the dual-type MCS units comprising the multicast switch according to claim 3 and a control section that controls the multicast switch; and
a splitter that branches or merges signal light to the each multicast switch of each of the dual-type MCS units.

* * * * *